US012678801B2

(12) United States Patent
Aleksieiev et al.

(10) Patent No.: US 12,678,801 B2
(45) Date of Patent: Jul. 14, 2026

(54) ELECTROSTATIC DUST SEPARATOR FOR PURIFYING AIR AND OTHER DIELECTRIC FLUIDS

(71) Applicant: MIKRONINTER-DIG GMBH, Berlin (DE)

(72) Inventors: Jurii Aleksieiev, Berlin (DE); Alexandra Babes, Berlin (DE); Vladimir Romanenko, Berlin (DE)

(73) Assignee: MIKRONINTER-DIG GMBH, Berlin (DE)

( * ) Notice: Subject to any disclaimer, the term of this patent is extended or adjusted under 35 U.S.C. 154(b) by 796 days.

(21) Appl. No.: 18/040,176

(22) PCT Filed: Jul. 1, 2021

(86) PCT No.: PCT/DE2021/100564
§ 371 (c)(1),
(2) Date: Feb. 1, 2023

(87) PCT Pub. No.: WO2022/002315
PCT Pub. Date: Jan. 6, 2022

(65) Prior Publication Data
US 2023/0356237 A1 Nov. 9, 2023

(30) Foreign Application Priority Data

Jul. 1, 2020 (DE) ......................... 202020103805.2
Jan. 20, 2021 (DE) ......................... 202021100251.4

(51) Int. Cl.
*B03C 3/09* (2006.01)
*B03C 3/47* (2006.01)
(Continued)

(52) U.S. Cl.
CPC .................. *B03C 3/09* (2013.01); *B03C 3/47* (2013.01); *B03C 3/68* (2013.01); *B03C 3/70* (2013.01); *B03C 5/026* (2013.01)

(58) Field of Classification Search
CPC .... B03C 3/09; B03C 3/47; B03C 3/68; B03C 3/70
See application file for complete search history.

(56) References Cited

U.S. PATENT DOCUMENTS

2010/0037766 A1 2/2010 Boyden et al.
2013/0036906 A1* 2/2013 Dunn ........................ B03C 3/12 95/79

FOREIGN PATENT DOCUMENTS

CN 107008571 A 8/2017
DE 202020103805 U1 7/2020
(Continued)

OTHER PUBLICATIONS

International Search Report dated Nov. 15, 2021; priority document.

*Primary Examiner* — Sharon Pregler
(74) *Attorney, Agent, or Firm* — Greer, Burns & Crain, Ltd.

(57) ABSTRACT

In order to improve the efficiency of purification of air or various dielectric gases and liquids with mechanical impurities, the housing of the proposed electrostatic dust separator comprises a plurality of collecting electrodes forming at least two electrically separated packages, and each package of collecting electrodes is configured to generate an inhomogeneous electric field upon application of high voltage.

11 Claims, 3 Drawing Sheets

(51) Int. Cl.

| | |
|---|---|
| ***B03C 3/68*** | (2006.01) |
| ***B03C 3/70*** | (2006.01) |
| *B03C 5/02* | (2006.01) |

(56) References Cited

FOREIGN PATENT DOCUMENTS

| | | | | |
|---|---|---|---|---|
| EP | 1967277 | A1 * | 9/2008 | ............ B03C 3/763 |
| GB | 1267777 | A | 3/1972 | |
| JP | 2002018318 | A | 1/2002 | |
| RU | 2420356 | C1 | 6/2011 | |
| RU | 2492934 | C2 | 9/2013 | |

* cited by examiner

ELECTROSTATIC DUST SEPARATOR FOR PURIFYING AIR AND OTHER DIELECTRIC FLUIDS

CROSS-REFERENCES TO RELATED APPLICATIONS

This application claims the benefit of the International Application No. PCT/DE2021/100564, filed on Jul. 1, 2021, and of the German patent application No. 202021100251.4 filed on Jan. 20, 2021, and of the German patent application No. 202020103805.2 filed on Jul. 1, 2020, the entire disclosures of which are incorporated herein by way of reference.

FIELD OF THE INVENTION

The invention relates to electrical devices for purifying dielectric fluids with mechanical impurities. It can be used for purification of air or various dielectric gases and fluids.

BACKGROUND OF THE INVENTION

DE 20 2020 103 805 U1 discloses an electric filter device for dielectric liquids. The device comprises a housing, a set of collecting electrodes in the form of metal plates and partitions made of dielectric material, wherein the electrodes and partitions form cells in which the impurities are collected.

The disclosure of DE 20 2020 103 805 U1 is herein incorporated by reference for disclosure purposes.

SUMMARY OF THE INVENTION

It is an object of the invention to improve the efficiency of electric purifiers.

The invention provides an electrostatic dust separator for purifying dielectric fluids, preferably air, the electrostatic dust separator comprising a housing containing a plurality of collecting electrodes, wherein the collecting electrodes form at least two electrically separated bundles.

Preferably, each bundle of collecting electrodes is designed to generate an inhomogeneous electric field when exposed to high voltage.

Preferably, each adjacent bundle is separated from each other by means of an elongated dielectric partition.

Preferably, the collecting electrodes are divided into at least three bundles, wherein the length of the partition walls between adjacent bundles increases, decreases, or remains the same in the direction of fluid flow.

Preferably, the number of collecting electrodes in each bundle increases, decreases, or remains the same in the direction of fluid flow.

Preferably, the length of the bundles of collecting electrodes increases, decreases, or remains the same in the direction of the fluid flow.

Preferably, the length, d2, of the further elongated dielectric partition is greater than the length, d1, of the elongated dielectric partition, wherein the value of the length, d1 and d2, respectively, of the elongated dielectric partitions is equal to or greater than the length, c1 and c2, respectively of the bundle of collecting electrodes located upstream of the respective partition.

Preferably, the length of the next bundle of collecting electrodes is greater than the length of the previous bundle of collecting electrodes.

Preferably, the length, d2, of the further elongate dielectric partition is smaller than the length, d1, of the elongate dielectric partition, wherein the length, d1 and d2, respectively, of the elongate dielectric partitions is equal to or greater than the length, c1 and c2, respectively, of the bundle of collecting electrodes located upstream of the respective partition.

Preferably, the length of the next bundle of collecting electrodes is smaller than that of the previous bundle of collecting electrodes.

Preferably, the housing includes high-voltage bushings for connecting adaptive high-voltage supply devices.

Preferably, the electrostatic dust separator is designed to gradually filter the fluid, preferably air.

Preferably, each collecting electrode has at least one longitudinal channel for passing the fluid.

Preferably, adjacent collection electrodes of the same bundle define a storage cell between them.

Preferably, each longitudinal channel fluidly connects a pair of adjacent storage cells.

Preferably, the housing has an inlet and an outlet for the fluid at its respective end portions.

Preferably, the housing contains, adjacent to its respective end regions, a respective fluid flow-through, preferably air-flow-through limiting plate spacing the collecting electrodes from the wall of the housing and electrically insulating them.

The invention provides a filtering device comprising a preferred electrostatic dust separator and an adaptive high voltage source for providing different high voltage DC electrical current to supply the bundles of collecting electrodes with different potentials.

The invention provides using an electrostatic dust separator for purifying dielectric fluids, wherein a plurality of spaced apart and electrically separated bundles of collecting electrodes can each have different electric potentials imposed on them and/or be balanced in such a way that the strength of the electric field changes in the direction of the flow of the fluid which is preferably air.

Preferably, the strength of the electric field increases or decreases in the direction of the flow of the fluid which is preferably air.

Preferably, the fluid, which is preferably air, is filtered in stages in the direction of flow.

The invention provides a purification method for purifying dielectric fluids, preferably air, by means of an electrostatic dust separator, wherein the electrostatic dust separator comprises a housing containing a plurality of collecting electrodes, wherein the collecting electrodes form at least two bundles electrically separated from each other and wherein the fluid flows through the bundles.

Preferably, high voltage is supplied to each bundle of collecting electrodes and an inhomogeneous electric field is generated.

Preferably, the electrostatic dust separator gradually filters the fluid.

The electrostatic dust separator may be a preferred electrostatic dust separator as previously described.

A fluid is, for example, a mixture of a fluid and solid particles. The fluid can be gaseous or liquid. The fluid may itself also be a mixture, for example a mixture of several immiscible fluids, i.e., an emulsion. For example, the fluid mixture is a heterogeneous mixture, such as an aerosol, a suspension, or a mixture of an emulsion and solid particles. Preferably, the fluid is air.

Solid particles in a fluid mixture can represent an impurity of the fluid. Electrostatic dust separators, also electrostatic precipitators, which are based on the electrostatic principle, are known for purifying fluids from impurities.

One idea of the invention is to divide the previously single bundle of collecting electrodes into several bundles of collecting electrodes, for example by inserting elongated dielectric partitions between the bundles. In order to be able to generate inhomogeneous electric fields, different values of the potential difference of adaptive high-voltage power supplies can be supplied for each bundle of collecting electrodes. In this process, the previously used pins, which perform the wiring function, can be replaced by high-voltage feedthroughs. The result is a structure of independent bundles, each optimized for purifying particles of the required size.

With the electrostatic dust separator described herein, it is possible to generate different non-uniform electric fields in the electrostatic dust separator section by section, so that the fields can be optimized for purifying particles of different sizes in dielectric fluids, namely in air or in liquid. This can increase the efficiency of the electrostatic dust separator.

BRIEF DESCRIPTION OF THE DRAWINGS

Exemplary embodiments are explained in more detail below with reference to the enclosed figures. Herein.

DETAILED DESCRIPTION OF THE PREFERRED EMBODIMENTS

Figure 1:
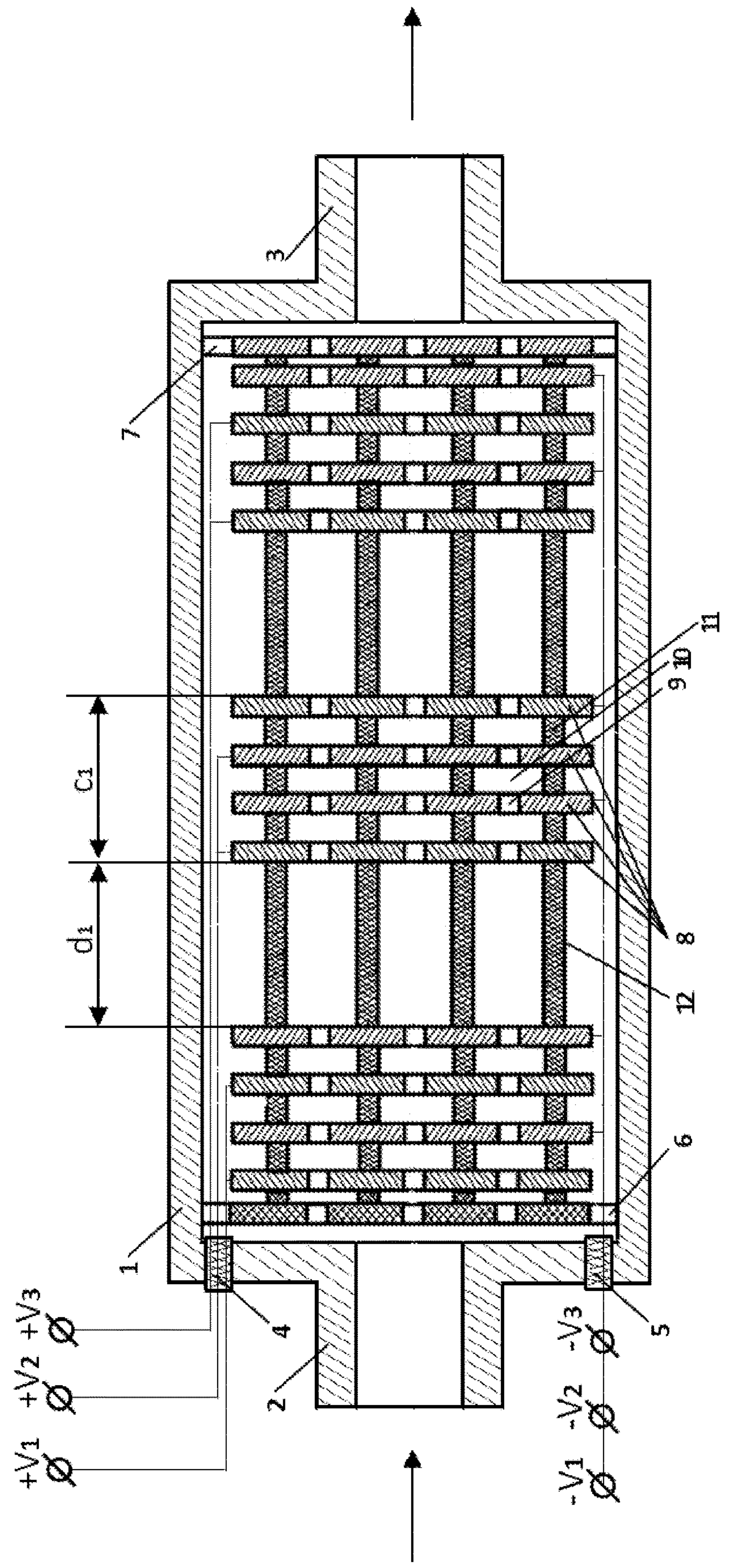
FIG. 1 shows a longitudinal cross-section through a first embodiment of an electrostatic dust separator.

FIG. 1 shows an electrostatic dust separator, which can also be referred to as an electrostatic precipitator. The electrostatic dust separator includes a housing 1 with nozzles for an inlet 2 and an outlet 3. The housing 1 has high-voltage bushings 4 and 5. Limiting plates 6 and 7 are provided in the housing 1 at respective end portions of the housing 1.

The electrostatic dust separator contains a plurality of bundles of collecting electrodes 8 in its housing 1. The bundles have a length c1 along the longitudinal direction of the housing 1. The collecting electrodes 8 of each bundle are separated by elongated dielectric partitions 11. The collecting electrodes 8 have longitudinal channels 9. Adjacent collecting electrodes 8 of the same bundle define storage cells 10 between them.

The collecting electrodes 8 of the adjacent bundles are separated from each other by elongated dielectric partitions 12 of length d1.

Using the high voltage inputs 4 and 5, the corresponding positive and negative potentials are supplied to each bundle of collecting electrodes 8 from a high voltage DC source not shown in detail. These high voltage values are adjusted in adaptive power supplies for the dielectric medium to be purified, depositing the required range of particle sizes of impurities in the corresponding bundle of collecting electrodes 8.

The electrostatic dust separator works as follows:

The flow of a contaminated dielectric medium, for example air or liquid, is fed into the electric purifier through the inlet 2. When a potential difference exists at each bundle of collecting electrodes 8, correspondingly optimized inhomogeneous electric fields appear in the channels, under whose action the impurities are pulled along from the main flow of the medium into the storage cells 10 and deposited on the collecting electrodes 8 of the bundles. The purified medium exits through the outlet 3.

FIG. 1 shows a uniform configuration for assembling bundles of collecting electrodes 8, wherein the value of the length d1 of the elongated dielectric partitions is equal to or greater than the length c1 of the bundles. The length of all the bundles is identical and equal to the length c1.

Figure 2:
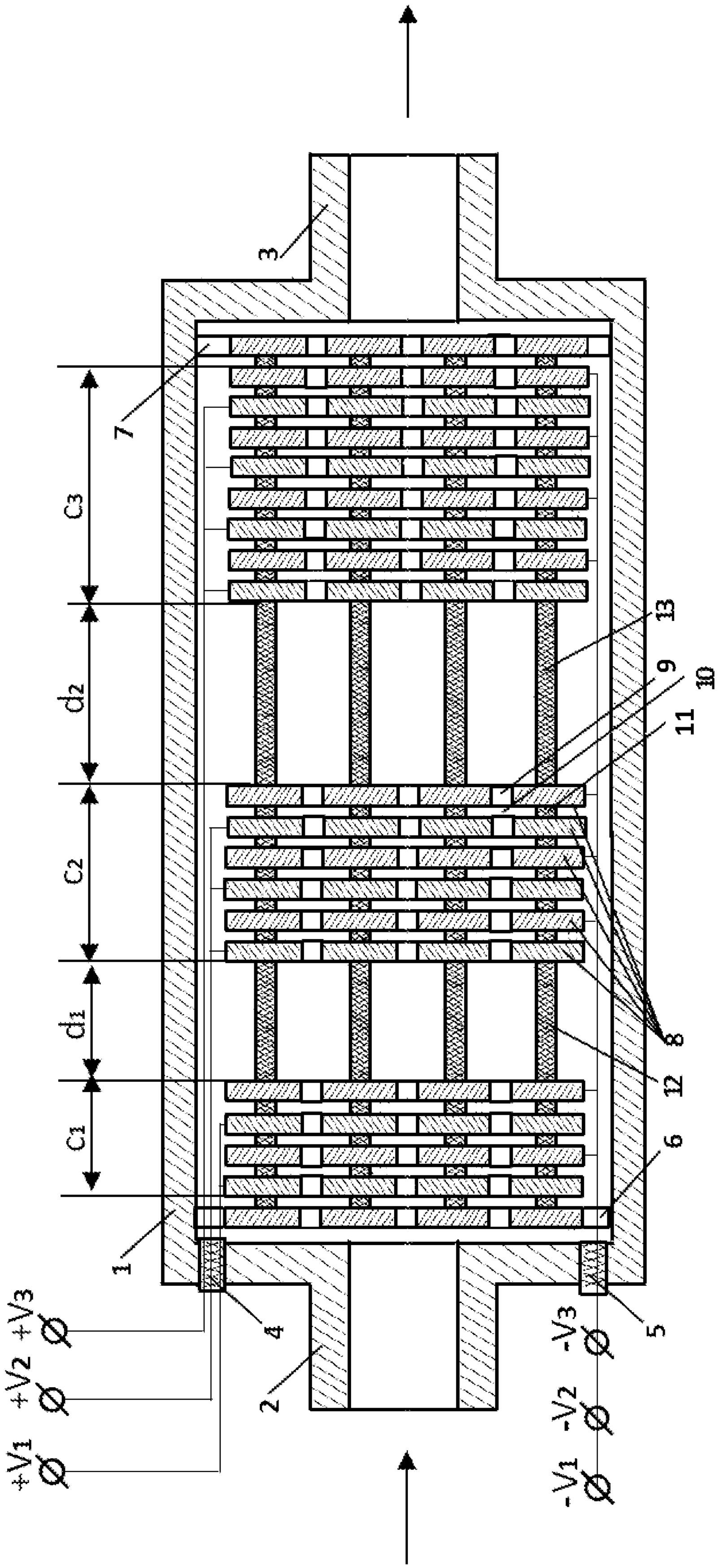
FIG. 2 shows a longitudinal cross-section through a second embodiment of an electrostatic dust separator.

FIG. 2 shows a longitudinal cross-section of an electrostatic dust separator 1 having an increasing number of collecting electrodes 8 in each bundle. The reference signs in FIG. 2 are identical to the reference signs in FIG. 1, although, in addition to the elongated dielectric partitions 12, further elongated dielectric partitions 13 with length d2 are arranged.

In the increasing configuration of the bundles of collecting electrodes 8, the length d2 of the further elongated dielectric partitions 13 is greater than the length d1 of the elongated dielectric partitions 12. Furthermore, the corresponding value of the length d1 or d2 of the elongated dielectric partitions 12, 13 is equal to or greater than the length c1 or c2 of the bundle located in front of the respective partition 12, 13. The length of the next bundle is greater than that of the previous bundle (c1>c2, c2>c3).

The following conditions shown in Table 1 apply to the increasing configuration of bundles of collecting electrodes:

TABLE 1

| | Length | | |
|---|---|---|---|
| Bundle number No. | Bundle | elongated dielectric partitions | Condition |
| 1 | $c_1$ | $d_1$ | $(d_1 \geq c_1) < c_2$ & $c_2 > c_1$ |
| 2 | $c_2$ | $d_2$ | $(d_2 \geq c_2) < c_3$ & $c_3 > c_2$ |
| . . . | . . . | . . . | . . . |
| n-1 | $c_{n-1}$ | $d_{n-1}$ | $(d_{n-1} \geq c_{n-1}) < c_n$ & $c_n > c_{n-1}$ |
| n | $c_n$ | — | $c_n > c_{n-1}$ |

Figure 3:
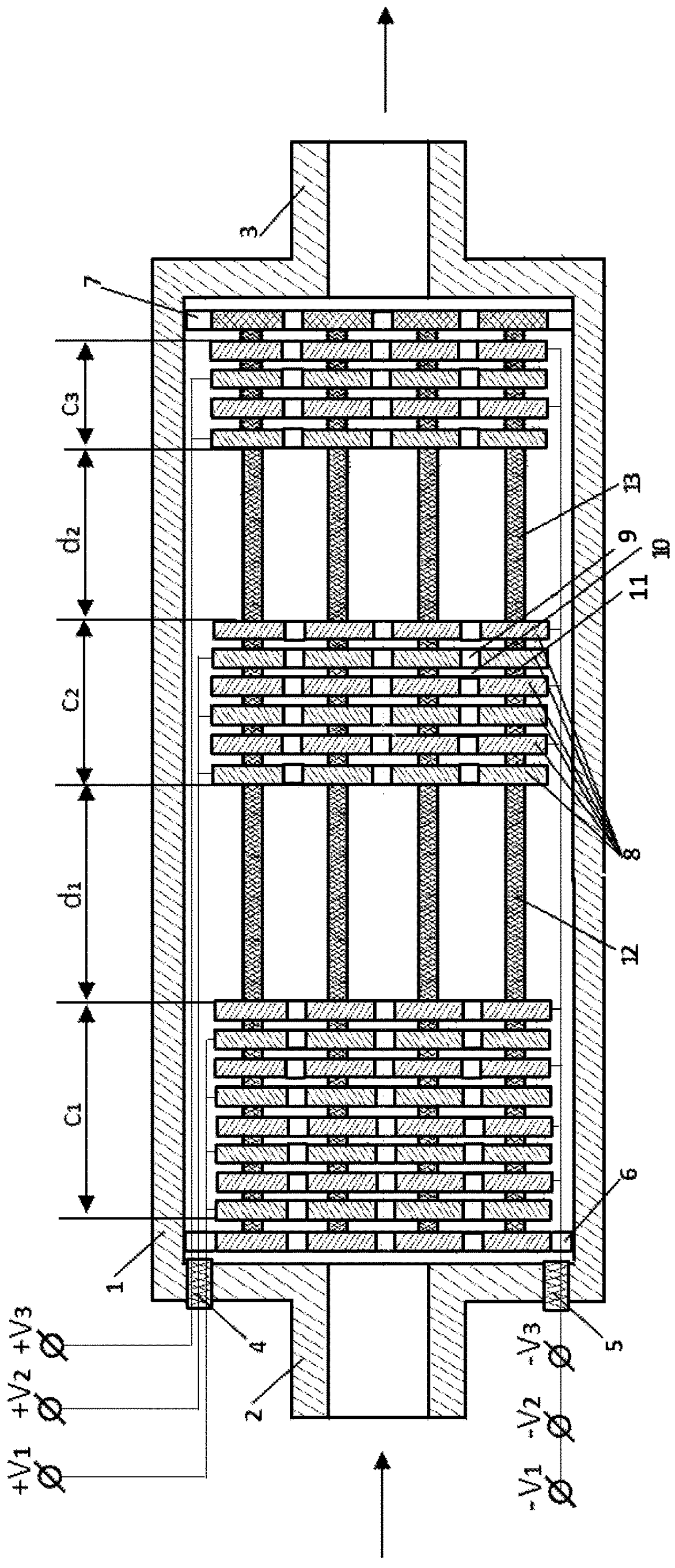
FIG. 3 shows longitudinal cross-section through a third embodiment of an electrostatic dust separator.

FIG. 3 shows a longitudinal cross-section of an electrostatic dust separator 1 with the structure of a decreasing number of collecting electrodes 8 in each bundle. The reference signs in FIG. 3 are identical to the reference signs in FIG. 2.

In a decreasing configuration of the bundles of collecting electrodes 8, the length d2 of the further elongated dielectric partition 13 is smaller than the length d1 of the elongated dielectric partition 12. The length d1 or d2 of the elongated dielectric partitions 12, 13 is equal to or greater than the length c1 or c2 of the bundle located in front of the respective partition 12, 13. The length of the next bundle is less than that of the previous bundle (c1<c2, c2<c3).

The following conditions shown in Table 2 apply to the decreasing configuration of bundles of collecting electrodes:

TABLE 2

| | Length | | |
|---|---|---|---|
| Bundle number No. | Bundle | elongated dielectric partitions | Condition |
| 1 | $c_1$ | $d_1$ | $(d_1 \geq c_1) > c_2$ & $c_2 < c_1$ |
| 2 | $c_2$ | $d_2$ | $(d_2 \geq c_2) > c_3$ & $c_3 < c_2$ |
| . . . | . . . | . . . | . . . |

TABLE 2-continued

| | Length | | |
|---|---|---|---|
| Bundle number No. | Bundle | elongated dielectric partitions | Condition |
| n-1 | $c_{n-1}$ | $d_{n-1}$ | $(d_{n-1} \geq c_{n-1}) > c_n$ & $c_n < c_{n-1}$ |
| n | $c_n$ | — | $c_n < c_{n-1}$ |

With the described electrostatic dust separator, the dielectric medium, for example air or liquid, can be purified using inhomogeneous electric fields in each bundle of collecting electrodes, with the electric field optimized for particles of the required size depending on the purification task at hand, so that the purification efficiency increases significantly.

Testing of the electrostatic dust separator conducted by the applicant showed that with the designs of the electrostatic dust separator as described herein, the efficiency of the electrostatic dust separator and its productivity increased by 35% to 45%.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 housing
2 inlet
3 outlet
4 high-voltage bushing
5 high-voltage bushing
6 limiting plate
7 limiting plate
8 collecting electrode
9 longitudinal channel
10 storage cell
11 partition
12 partition
13 partition

The invention claimed is:

1. An electrostatic dust separator for purifying dielectric fluids, the electrostatic dust separator comprising:
a housing comprising at least three successive bundles of collecting electrodes, each bundle comprising at least one pair of electrically connected collecting electrodes,
wherein the pairs of electrically connected collecting electrodes of adjacent bundles are electrically separated from each other and can be subjected to different potentials such that a strength of an electric field changes in a flow direction of a fluid,
wherein adjacent bundles are spaced apart from each other by means of an elongated dielectric partition,
wherein a first length of an elongated dielectric partition wall is larger or smaller than a second length of an elongated dielectric partition wall following in the flow direction, and
wherein the first and second lengths of the elongated dielectric partition walls are respectively equal to or greater than first and second lengths of the respective bundles lying closest to the elongated dielectric partition walls against the flow direction.

2. The electrostatic dust separator according to claim 1, wherein the dielectric fluid comprises air.

3. The electrostatic dust separator according to claim 1, wherein the first and second lengths of the elongated dielectric partition walls between adjacent bundles in the flow direction of the fluid increases or decreases.

4. The electrostatic dust separator according to claim 1, wherein a number of collecting electrodes in each bundle in the flow direction of the fluid increases, decreases or remains the same.

5. The electrostatic dust separator according to claim 1, wherein a length of the bundles of collecting electrodes in the flow direction of the fluid increases, decreases or remains the same.

6. The electrostatic dust separator according to claim 1, wherein a length of a bundle of collecting electrodes is greater than or less than a length of a closest bundle of collecting electrodes in a direction of flow.

7. The electrostatic dust separator according to claim 1, wherein the housing has high-voltage bushings for connecting adaptive high-voltage supply devices.

8. The electrostatic dust separator according to claim 1, wherein each collecting electrode has at least one longitudinal channel for a passage of the fluid.

9. The electrostatic dust separator according to claim 1, wherein adjacent collecting electrodes of a same bundle define a memory cell therebetween.

10. The electrostatic dust separator according to claim 7, wherein each longitudinal channel fluidly connects a pair of adjacent storage cells.

11. The electrostatic dust separator according to claim 1, wherein the housing comprises, adjacent to its respective end regions, a respective limiting plate which allows fluid, to flow through the housing, and which spaces the collecting electrodes from a wall of the housing and electrically insulates them.

* * * * *